(12) United States Patent
Tachibana et al.

(10) Patent No.: US 8,067,853 B2
(45) Date of Patent: Nov. 29, 2011

(54) POWER SUPPLY SYSTEM

(75) Inventors: Takeshi Tachibana, Chiryu (JP);
Hiroyoshi Ito, Toyota (JP)

(73) Assignee: Toyota Jidosha Kabushiki Kaisha,
Toyota (JP)

( * ) Notice: Subject to any disclaimer, the term of this patent is extended or adjusted under 35 U.S.C. 154(b) by 70 days.

(21) Appl. No.: 12/452,119

(22) PCT Filed: Sep. 17, 2008

(86) PCT No.: PCT/JP2008/066764
§ 371 (c)(1),
(2), (4) Date: Dec. 16, 2009

(87) PCT Pub. No.: WO2009/038087
PCT Pub. Date: Mar. 26, 2009

(65) Prior Publication Data
US 2010/0102626 A1    Apr. 29, 2010

(30) Foreign Application Priority Data
Sep. 18, 2007   (JP) .................. 2007-241404

(51) Int. Cl.
*B60L 1/00*    (2006.01)
(52) U.S. Cl. ...................................... 307/10.1
(58) Field of Classification Search ............ 307/9.1, 307/10.1; 290/40 C
See application file for complete search history.

(56) References Cited

U.S. PATENT DOCUMENTS

| 7,336,002 | B2 * | 2/2008 | Kato et al. | ............... 307/10.6 |
| 7,872,362 | B2 * | 1/2011 | Kato et al. | ............... 290/40 C |
| 2006/0097577 | A1 | 5/2006 | Kato et al. | |
| 2008/0036431 | A1 | 2/2008 | Wolf et al. | |

FOREIGN PATENT DOCUMENTS

| DE | 10 2004 041 511 A1 | 3/2006 |
| JP | A 4-96631 | 3/1992 |
| JP | A 2001-69683 | 3/2001 |
| JP | A 2002-171691 | 6/2002 |
| JP | A 2002-176704 | 6/2002 |
| JP | A 2004-328988 | 11/2004 |
| JP | A 2004-350426 | 12/2004 |
| JP | A 2006-304515 | 11/2006 |

OTHER PUBLICATIONS

International Search Report issued in corresponding International Application No. PCT/JP2008/066764, mailed Dec. 2, 2008.

* cited by examiner

*Primary Examiner* — Michael Rutland Wallis
(74) *Attorney, Agent, or Firm* — Oliff & Berridge, PLC

(57) ABSTRACT

The power supply system includes a generator, a transformer circuit, and a battery. The generator generates electric power of a first voltage. The transformer circuit boosts the electric power of the first voltage to a second voltage. The battery is connected, via the transformer circuit, to the generator and stores electric power of the second voltage obtained by the boosting by the transformer circuit. At least one of actuators is connected on the generator side of the transformer circuit, so as to be supplied with the electric power of the first voltage.

7 Claims, 5 Drawing Sheets

F I G. 1
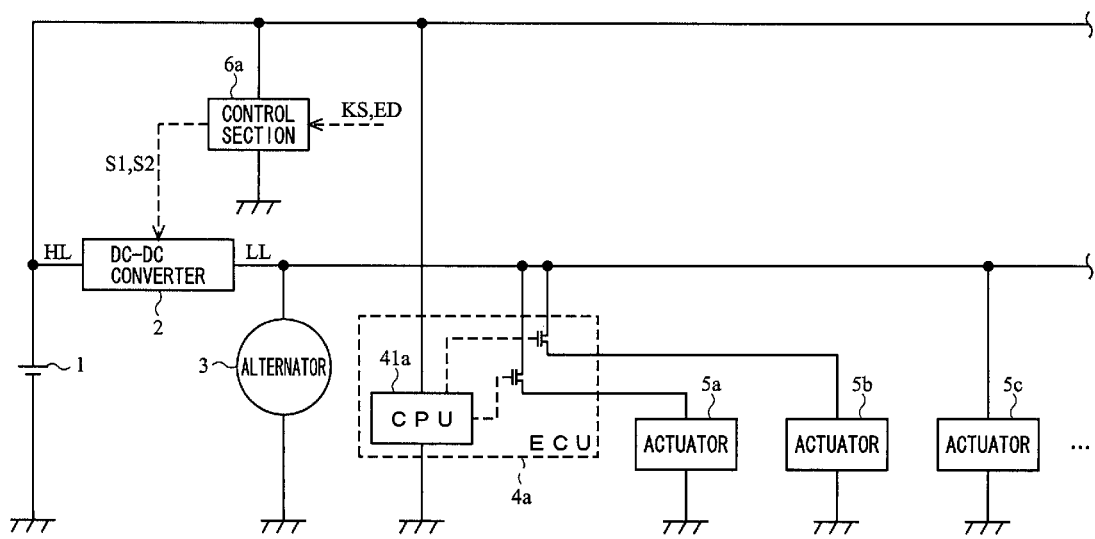

F I G. 2
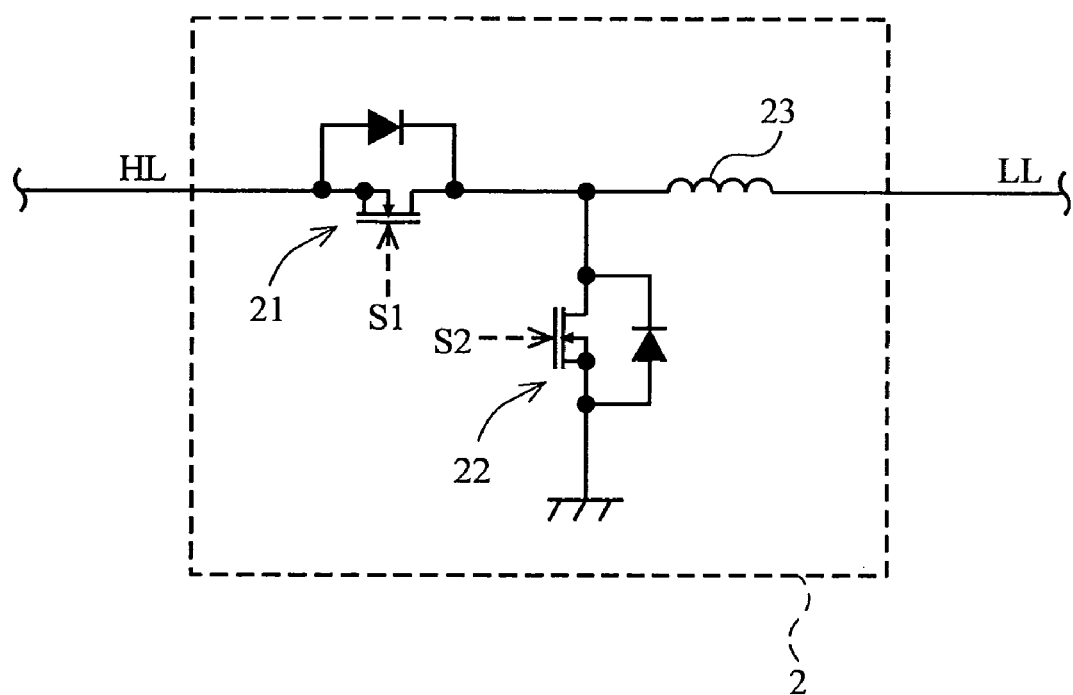

POWER SUPPLY SYSTEM

TECHNICAL FIELD

The present invention relates to a power supply system that supplies electric power to an electric load.

BACKGROUND ART

Conventionally, a vehicle having an internal combustion engine mounted therein has been commercialized. In such a vehicle, for example, a power supply system is mounted as shown in FIG. 5. In FIG. 5, a battery 101 that supplies electric power of a predetermined voltage (for example, approximately 12V) is mounted in the vehicle. The battery 101 is charged with electric power generated by an alternator (generator) 102 that is driven under a rotation torque from the internal combustion engine. To the inside of the vehicle, a plurality of electric loads that are supplied with electric power from the battery 101 or the alternator 102 are connected. In FIG. 5, as exemplary electric loads, an ECU 103 and a plurality of actuators 104 (three representative actuators 104a to 104c) are shown. Note that, the operations of the actuators 104a and 104b are each controlled by the ECU 103.

A power supply system with two batteries, which is mounted in a vehicle, has also been developed, the two batteries supplying electric power of different voltages, respectively (for example, see Patent Document 1). In the power supply system, upon detection of a drop of the output voltage of one battery, the output voltage of the other battery is boosted or stepped down to the output voltage of the one battery by a DC-DC converter, such that the resultant electric power is supplied.
Patent Document 1: Japanese Laid-open Patent Publication No. 2002-171691

DISCLOSURE OF THE INVENTION

Problems to be Solved by the Invention

However, in order to charge the battery 101, it is necessary for the alternator 102 to generate electricity of a power generation voltage (for example, approximately 14V) higher than the voltage (for example, approximately 12V) of the battery 101. Accordingly, the power generation voltage is also applied to each electric load that is supplied with electric power from an electric power supply line that supplies electric power from the battery 101 or the alternator 102, which causes each electric load to consume electric power of the power generation voltage.

Here, in general, the rated voltage of each electric load connected to the electric power supply line is the battery voltage, and each electric load is able to operate, performing the predetermined function thereof, when the rated voltage is applied. However, since a voltage higher than the rated voltage is supplied to each electric load connected to the electric power supply line, a higher power consumption is caused at each electric load. Further, the higher power consumption also increases the power generation load of the alternator 102, thus aggravating fuel consumption of the vehicle with the power supply system mounted thereon.

In the power supply system disclosed in Patent Document 1 as well, in order to charge the two batteries of different voltages, respectively, it is necessary to supply a voltage higher than the battery voltages. Accordingly, a voltage higher than the battery voltages is also applied to each electric load in the power supply system, which causes a higher power consumption at each electric load, as well. Naturally, the higher power consumption at each electric load also causes a larger power generation load of the generator provided in the power supply system.

Therefore, an object of the present invention is to provide a power supply system in which a battery and the like supplies electric power to an electric load, the power supply system securing the charging performance for a battery while suppressing the power consumption at the electric load.

Solution to the Problems

To achieve the above objects, the present invention has the following aspects.

A first aspect of the present invention is a power supply system that supplies electric power to electric loads including actuators, the electric loads being mounted in a movable body. The power supply system includes a generator, a transformer circuit, and a battery. The generator generates electric power of a first voltage. The transformer circuit boosts the electric power of the first voltage to a second voltage. The battery is connected, via the transformer circuit, to the generator and stores electric power of the second voltage obtained by the boosting by the transformer circuit. At least one of the actuators is connected on the generator side of the transformer circuit, so as to be supplied with the electric power of the first voltage.

In a second aspect based on the first aspect, the electric loads include a control device. The control device controls a moving function of the movable body. The control device is connected on the battery side of the transformer circuit.

In a third aspect based on the second aspect, the actuators include a controlled actuator. The drive of the controlled actuator is controlled by the control device. The controlled actuator is connected on the generator side of the transformer circuit.

In a fourth aspect based on the first aspect, The transformer circuit is configured to be capable of supplying electric power bidirectionally from the generator side to the battery side and from the battery side to the generator side. The power supply system further includes a transformer circuit control section. The transformer circuit control section controls a power supply direction and a power supply voltage of the transformer circuit in accordance with a state of the movable body.

In a fifth aspect based on the fourth aspect, when supplying electric power from the generator side to the battery side, the transformer circuit control section controls the transformer circuit to boost the electric power of the first voltage to the second voltage, so as to supply the resultant electric power to the battery side. When supplying electric power from the battery side to the generator side, the transformer circuit control section controls the transformer circuit to step down electric power of an output voltage of the battery to the first voltage, so as to supply a resultant electric power to the generator side.

In a sixth aspect based on the fourth aspect, when supplying electric power from the generator side to the battery side, the transformer circuit control section controls the transformer circuit to boost the electric power of the first voltage to the second voltage, so as to supply the resultant electric power to the battery side. When supplying electric power from the battery side to the generator side, the transformer circuit control section controls the transformer circuit to supply electric power of an output voltage of the battery to the generator side, the electric power being unchanged.

In a seventh aspect based on the sixth aspect, when the movable body is in an engine operating state, the transformer circuit control section controls the transformer circuit to supply electric power from the generator side to the battery side. When the movable body is in an engine stop state, the transformer circuit control section controls the transformer circuit to supply electric power from the battery side to the generator side.

In a eighth aspect based on the first aspect, the battery is a lead storage battery.

Effect of the Invention

According to the first aspect, the battery is charged with the electric power of the second voltage obtained by boosting the electric power of the first voltage from the generator by the transformer circuit, and concurrently, the actuators are supplied with the electric power of the first voltage from the generator. That is, it is possible to set the power generation voltage of the generator lower than the charging voltage for the battery, thereby enabling adjustment of the power generation voltage to the rated voltage of the actuators. Therefore, it is possible to apply an optimum voltage to the electric loads, while securing the charging performance for the battery, thereby enabling suppression of the power consumption at the electric loads and improvement of the fuel consumption of the vehicle.

According to the second aspect, the actuators are connected on the generator side of the transformer circuit and the control device is connected on the battery side of the transformer circuit, with the transformer circuit inserted therebetween. Thus, by separating the power supply path for the control device and the power supply path for the actuators, it is possible to prevent a voltage drop associated with operations of the actuators from influencing the control device. Further, since the transformer circuit (for example, a DC-DC converter) is inserted between the generator and the battery, voltage fluctuation at the time of supplying electric power generated by the generator to the battery side is suppressed. Therefore, the voltage of the electric power to be supplied to the control device, which is supplied with electric power from the battery side, is also stabilized, which eliminates the necessity of taking into consideration the voltage fluctuation at the time of an electric power supply, thereby contributing to designing an electric power supply circuit in control devices.

According to the third aspect, the power supply path for the actuators and the power supply path for the control device that controls the drive of the actuators are separated. Accordingly, an influence of a voltage drop, which is associated with the drive of the actuators controlled by the control device, on the control device is prevented, thereby preventing the control device itself from being reset, which is caused by the control device performing a drive start control. Accordingly, it is possible to prevent malfunction of the whole system, thereby enabling stabilization of the whole system.

According to the fourth aspect, before the generator has started generating electric power, electric power can be supplied from the battery to each electric load. Further, since the transformer circuit (for example, a DC-DC converter) is inserted between the battery and the generator, it is possible to arbitrarily control the charging voltage for the battery. By adjusting the control operation of the transformer circuit, it is possible to construct a power supply system in which various power storage devices are charged.

According to the fifth aspect, when the generator is not generating electric power, it is possible to step down the output voltage of the battery to an appropriate voltage (for example, the rated voltage for the electric loads), so as to supply electric power to the electric loads such as actuators.

According to the sixth aspect, in a case where the output voltage of the battery is matched with the rated voltage of the electric loads such as actuators, when the generator is not generating electric power, it is possible to supply the electric power of the battery to the electric loads, the electric power being unchanged.

According to the seventh aspect, it is possible to supply appropriate electric power in accordance with the engine operating/stop state of the movable body.

According to the eighth aspect, it is possible to construct a power supply system in which a common lead storage battery is used as a battery.

BRIEF DESCRIPTION OF THE DRAWINGS

FIG. 1 is a schematic block diagram showing an exemplary configuration of a part of a power supply system according to an embodiment of the present invention.

FIG. 2 is a diagram showing an internal configuration of an exemplary DC-DC converter 2 shown in FIG. 1.

DESCRIPTION OF THE REFERENCE CHARACTERS

Figure 3:
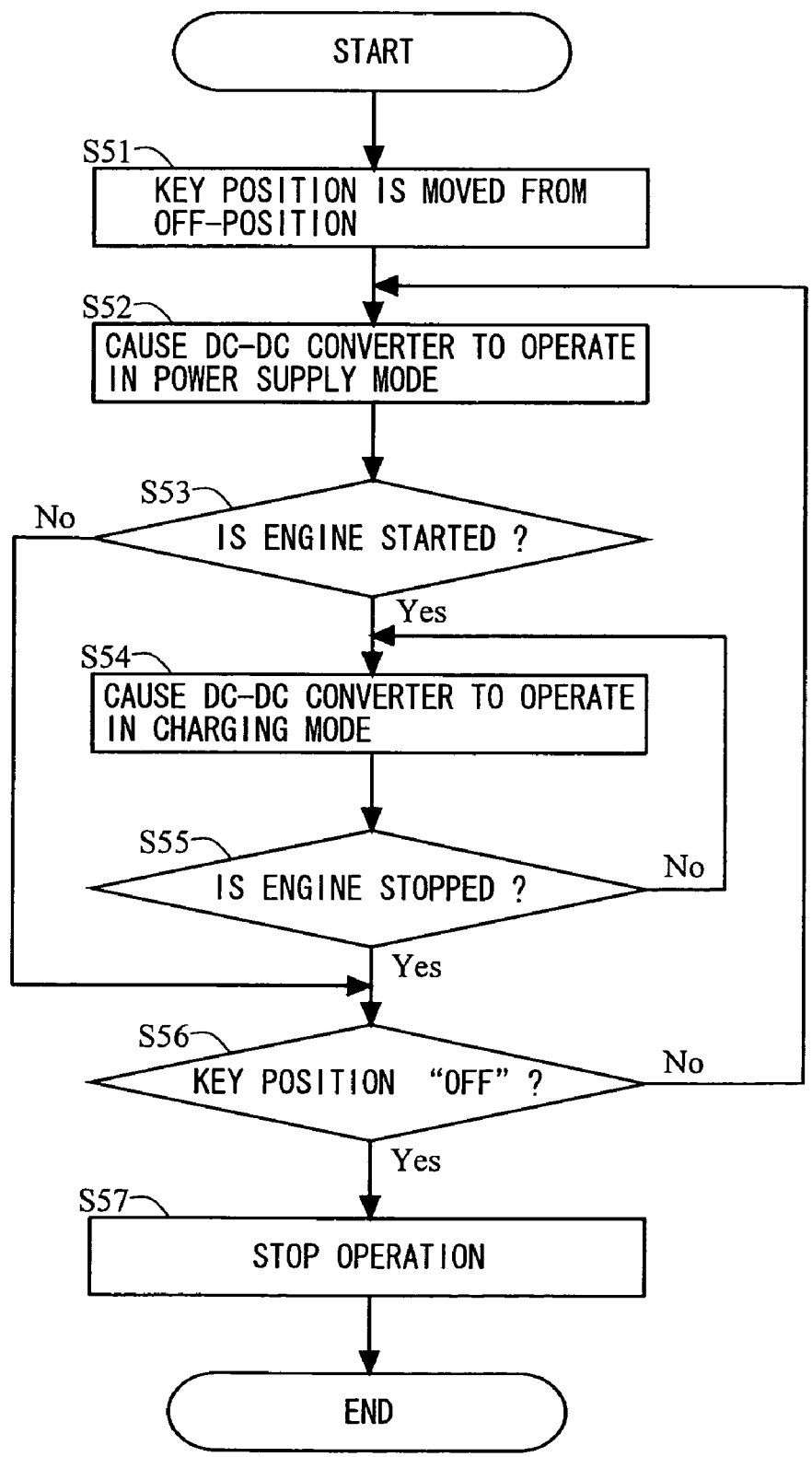
FIG. 3 is a flowchart showing an exemplary operation of the DC-DC converter 2 shown in FIG. 1.

1 . . . battery
2 . . . DC-DC converter
21 . . . first switching device
22 . . . second switching device
23 . . . coil
3 . . . alternator
4 . . . ECU
41 . . . CPU
5 . . . actuator
6 . . . control section cl BEST MODE FOR CARRYING OUT THE INVENTION Hereinafter, with reference to FIG. 1, a power supply system according to an embodiment of the present invention is described. Typically, the power supply system is installed in a vehicle having an internal combustion engine mounted therein. FIG. 1 is a schematic block diagram showing an exemplary configuration of a part of the power supply system.

In FIG. 1, the power supply system includes a battery 1 that supplies electric power of a predetermined voltage. The battery 1 is connected to an alternator (generator) 3 via a DC-DC converter 2, and is charged with electric power generated by the alternator 3. The electric power from the battery 1 or the alternator 3 is supplied to electric loads provided in the vehicle. In FIG. 1, as exemplary electric loads provided in the vehicle, an ECU (Electronic Control Unit) 4a, a plurality of actuators 5 (in FIG. 1, three representative actuators 5a to 5c are shown), and a control section 6a are shown.

For example, the actuators 5a to 5c include driving system devices, such as an electric power steering device and a brake actuator that assist the running performance and the comfortability of the vehicle. The actuators 5a to 5c are electric loads that are connected to a low potential line LL, which is to be described below, so as to be supplied with electric power. The actuators 5a and 5b are controlled actuators whose operations are each controlled by the ECU 4*a*. On the other hand, the actuator 5*c* operates independently of the ECU 4*a*.

The battery 1 is a power storage device that stores electric power generated by the alternator 3 and that supplies the stored electric power to each electric load provided in the vehicle. As the battery 1, a lead storage battery having a rated voltage of, for example, approximately 12V is used. However, another secondary battery (for example, a nickel-hydrogen battery or a lithium ion battery) may be used. To the positive terminal of the battery 1, an electric power supply line (hereinafter referred to as a high potential line HL) is connected.

The alternator 3 is driven under a rotation torque from the internal combustion engine and generates electric power adjusted to a predetermined power generation voltage. For example, the alternator 3, which has provided therein an AC-DC converter for converting generated alternating current power into direct current power, generates direct current power adjusted to a predetermined voltage. To the positive terminal (B (battery) terminal) of the alternator 3, an electric power supply line (hereinafter referred to as a low potential line LL) is connected. The power generation voltage of the alternator 3 is set to match the rated voltage at which each of the electric loads (for example, the actuators 5*a* to 5*c*) connected to the low potential line LL is capable of operating while exerting the predetermined function thereof. For example, when the rated voltage of each electric load is 12V, the power generation voltage of the alternator 3 is also set to 12V.

The DC-DC converter 2 constitutes a transformer circuit capable of performing a bidirectional electric power supply, that is, the voltage of the direct current power supplied from one side is boosted or stepped down, so as to be outputted to the other side, and the DC-DC converter 2 controls the electric power supply between the battery 1 and the alternator 3. For example, as the DC-DC converter 2, a series converter or a switching converter is used. Hereinafter, with reference to FIG. 2, a switching, synchronous rectification DC-DC converter 2 is described. FIG. 2 is a diagram showing an internal configuration of an exemplary DC-DC converter 2.

In FIG. 2, the DC-DC converter 2 is connected to the positive terminal (the high potential line HL) of the battery 1, and to the positive terminal (the low potential line LL) of the alternator 3. The DC-DC converter 2 controls boosting the power generation voltage of the alternator 3 to the charging voltage for the battery 1, or stepping down the output voltage of the battery 1 to the supply voltage for each electric load when supplying electric power from the battery 1.

The DC-DC converter 2 includes a first switching device 21 and a coil 23 on an electric power supply line that connects the high potential line HL and the low potential line LL. The first switching device 21 is a bidirectional device and is composed of, for example, a MOSFET (MOS Field Effect Transistor). The first switching device 21 is inserted, onto the electric power supply line, with the source set to the battery 1 side and the drain set to the alternator 3 side. The electric power supply line between the first switching device 21 and the coil 23 is grounded via a second switching device 22. The second switching device 22 is inserted with the drain set to the electric power supply line side and the source grounded.

The output voltage to be applied to the gate of each of the first switching device 21 and the second switching device 22 is controlled by a driver not shown. The driver is controlled by the control section 6*a* (see FIG. 1), and turns on and off the first switching device 21 and the second switching device 22 in accordance with driving signals S1 and S2 outputted from the control section 6*a*, respectively. The control section 6*a* turns on and off the first switching device 21 and the second switching device 22 at a predetermined frequency at different timings, so as to cause the DC-DC converter 2 to perform a boosting operation or a step-down operation. Since a specific operation of turning on and off the switching devices is known, detailed description thereof is omitted.

When electric power is supplied from the alternator 3 to the battery 1 so as to charge the battery 1 (hereinafter this may be referred to as a charging mode), the control section 6*a* causes the DC-DC converter 2 to perform a boosting operation. Specifically, the DC-DC converter 2 boosts the power generation voltage generated by the alternator 3 to a charging voltage that allows the battery 1 to be charged, so as to supply the resultant electric power from the alternator 3 to the battery 1. For example, when the power generation voltage of the alternator 3 is 12V and the output voltage of the battery 1 is 12V, the DC-DC converter 2 boosts the power generation voltage of the alternator 3 to approximately 14V (the charging voltage) that is higher than the output voltage, so as to supply the resultant electric power from the alternator 3 to the battery 1.

When electric power is supplied from the battery 1 to each electric load connected to the low potential line LL (hereinafter this may be referred to as a power supply mode), the control section 6*a* causes the DC-DC converter 2 to perform a step-down operation. Specifically, the DC-DC converter 2 steps down the output voltage of the battery 1 to the rated voltage of each electric load, so as to supply the resultant electric power from the battery 1 to each electric load. Note that, when the rated voltage of each electric load connected to the low potential line LL and the output voltage of the battery 1 are equivalent, the DC-DC converter 2 may supply electric power from the battery 1 to each electric load, without performing a step-down operation (that is, electric power of the output voltage of the battery 1, unchanged).

Referring back to FIG. 1, the ECU 4*a* includes a CPU (Central Processing Unit) 41*a* therein. Electric power necessary for the CPU 41*a* to operate is supplied from the high potential line HL. That is, the CPU 41*a* is connected to the positive terminal of the battery 1 via the high potential line HL. The CPU 41*a* controls an electric power supply to the actuators 5*a* and 5*b*. Specifically, the electric power supply to the actuators 5*a* and 5*b* is controlled by performing ON/OFF control of the path from the low potential line LL to the actuators 5*a* and 5*b*.

The control section 6*a* is composed of a common microcomputer and the like. The control section 6*a* generates driving signals S1 and S2 based on a key position signal KS and engine state data ED that are inputted, and controls the operation of the DC-DC converter 2. Electric power necessary for the control section 6*a* to operate is supplied from the high potential line HL. That is, the control section 6*a* is connected to the positive terminal of the battery 1 via the high potential line HL.

Next, with reference to FIG. 3, the operation of the DC-DC converter 2 controlled by the control section 6*a* is described. FIG. 3 is a flowchart showing an exemplary operation of the DC-DC converter 2.

In FIG. 3, a driver of the vehicle in which the power supply system is mounted moves the key to the vehicle from the off position to another key position (step S51). The key operation by the driver causes an electric power supply from the battery 1 to the high potential line HL to be. started. Note that, the CPU 41*a* and the control section 6*a* may always be supplied with electric power from the battery 1 irrespective of the key position of the vehicle. Further, in response to the movement of the key to the vehicle from the off position to another key position, an electric power supply from the battery 1 to the CPU 41*a* and the control section 6*a* may be started.

Next, the control section 6*a* detects that the key position of the vehicle has been moved from the off position to another key position, and causes the DC-DC converter 2 to operate in the power supply mode (step S52). For example, the control section 6*a* obtains, from the ignition switch of the vehicle, a key position signal KS representing the key position, and detects that the key position of the ignition switch is at an ACC (accessory) position, an IG (ignition) position, or the like, other than the off position. Then, the control section 6*a* causes the DC-DC converter 2 to perform a step-down operation, so as to supply the resultant electric power from the battery 1 to each electric load. Through this operation of the DC-DC converter 2, electric power obtained by stepping down the output voltage of the battery 1 to the rated voltage of each electric load is supplied to each electric load (for example, the actuators 5*a* to 5*c*) via the low potential line LL. That is, when the key position of the vehicle is at the ACC position, the IG position at the time of the engine not operating, or the like, electric power is supplied from the battery 1 to each electric load.

Next, the control section 6*a* determines whether or not the vehicle is in an engine operating state (step S53). For example, the control section 6*a* determines whether or not the vehicle is in an engine operating state, with reference to a key position signal KS and engine state data ED (for example, data representing an engine speed or data representing a cam position or a crank position), both of which are obtained from the vehicle. Then, in the case of the engine operating state, the control section 6*a* advances the processing to the following step S54. On the other hand, in the case of an engine stop state, the control section 6*a* advances the processing to the following step S56.

In step S54, the control section 6*a* causes the DC-DC converter 2 to operate in the charging mode. For example, the control section 6*a* causes the DC-DC converter 2 to perform a boosting operation, so as to supply the resultant electric power from the alternator 3 to the battery 1. Through this operation of the DC-DC converter 2, electric power obtained by boosting the power generation voltage generated by the alternator 3 (for example, approximately 12V) to a charging voltage that allows the battery 1 to be charged (for example, approximately 14V) is supplied to the battery 1, whereby the battery 1 is charged. On the other hand, electric power of the power generation voltage generated by the alternator 3 is also supplied to each electric load (for example, the actuators 5*a* to 5*c*) via the low potential line LL. That is, when the vehicle is in the engine operating state, the battery 1 is charged at the charging voltage obtained by boosting the power generation voltage of the alternator 3 by the DC-DC converter 2, and concurrently, each electric load is supplied with electric power of the power generation voltage of the alternator 3. Since the electric power of the charging voltage is supplied to the high potential line HL, the electric loads (the CPU 41*a* and the control section 6*a*) that are supplied with electric power from the high potential line HL are also supplied with electric power of the charging voltage (for example, approximately 14V).

Next, the control section 6*a* determines whether or not the vehicle is in the engine stop state (step S55). For example, the control section 6*a* determines whether or not the vehicle is in the engine stop state, with reference to a key position signal KS and engine state data ED, both of which are obtained from the vehicle. In the case of the engine stop state, the control section 6*a* advances the processing to the following step S56. On the other hand, in the case of the engine operating state, the control section 6*a* causes the processing to return to step S54, such that the processing is repeated.

In step S56, the control section 6*a* determines whether or not the key position of the vehicle is at the off position. For example, the control section 6*a* determines whether or not the key position of the vehicle is at the off position, with reference to a key position signal KS obtained from the vehicle. When the key position of the vehicle is at the off position, the control section 6*a* stops the operation of the DC-DC converter 2 (step S57), so as to end the processing shown in the flowchart. On the other hand, when the key position of the vehicle is not at the off position, the control section 6*a* causes the processing to return to step S52, such that the processing is repeated.

As described above, in the power supply system according to the present embodiment, when the vehicle is in the engine operating state, the battery 1 is charged at the charging voltage obtained by boosting the power generation voltage of the alternator 3 by the DC-DC converter 2, and concurrently, each electric load is supplied with the electric power of the power generation voltage from the alternator 3. That is, it is possible to set the power generation voltage of the alternator 3 lower than the charging voltage for the battery 1, thereby enabling adjustment of the power generation voltage to the rated voltage of each electric load. Therefore, in the present power supply system, it is possible to apply an optimum voltage to the electric loads, while securing the charging performance for the battery 1, thereby enabling suppression of the power consumption of the electric loads and improvement of the fuel consumption of the vehicle.

Further, in the power supply system according to the present embodiment, since the DC-DC converter 2 is inserted between the battery 1 and the alternator 3, it is possible to arbitrarily control the charging voltage for the battery 1. Therefore, by adjusting the boosting operation of the DC-DC converter 2, it is possible to construct a power supply system in which various power storage devices are charged. For example, even in a case where a new power storage device to be developed in the future is to be mounted in a vehicle, the new power storage device can be incorporated into the power supply system by adjusting the control operation of the DC-DC converter 2.

Further, in the power supply system according to the present embodiment, since the DC-DC converter 2 is inserted between the alternator 3 and the high potential line HL, voltage fluctuation at the time of supplying the electric power generated by the alternator 3 to the high potential line HL is suppressed. Accordingly, the voltage of the electric power to be supplied to the CPU 41 and the control section 6, which are supplied with electric power from the high potential line HL, is also stabilized, which eliminates the necessity of taking into consideration the voltage fluctuation at the time of an electric power supply, thereby enabling contribution to designing an electric power supply circuit in control system devices.

In addition, in the power supply system according to the present embodiment, there provided are the low potential line LL and the high potential line HL with the DC-DC converter 2 inserted therebetween. To the low potential line LL, the driving system devices (the actuators 5*a* to 5*c*) are connected, and to the high potential line HL, the control system devices (the CPU 41*a* and the control section 6*a*) are connected. Thus, by separating the power supply path for the control system devices and the power supply path for the driving system devices, it is possible to prevent a voltage drop associated with operations of the driving system devices from influencing the control system devices. For example, in a case where the same power supply path is used for both the control system devices and the driving system devices, a drive of an actuator included in the driving system devices may lower the voltage of the electric power in the power supply path, which may also lower the voltage of the electric power supplied to the control system devices. If the voltage of the power supply path drops lower than the voltage at which the operations of the control system devices are assured, the operations of the control system devices may be reset, thereby causing malfunction of the whole system. In the power supply system according to the present embodiment, it is possible to prevent the voltage drop from influencing such control system devices, thereby enabling stabilization of the whole system.

Figure 4:
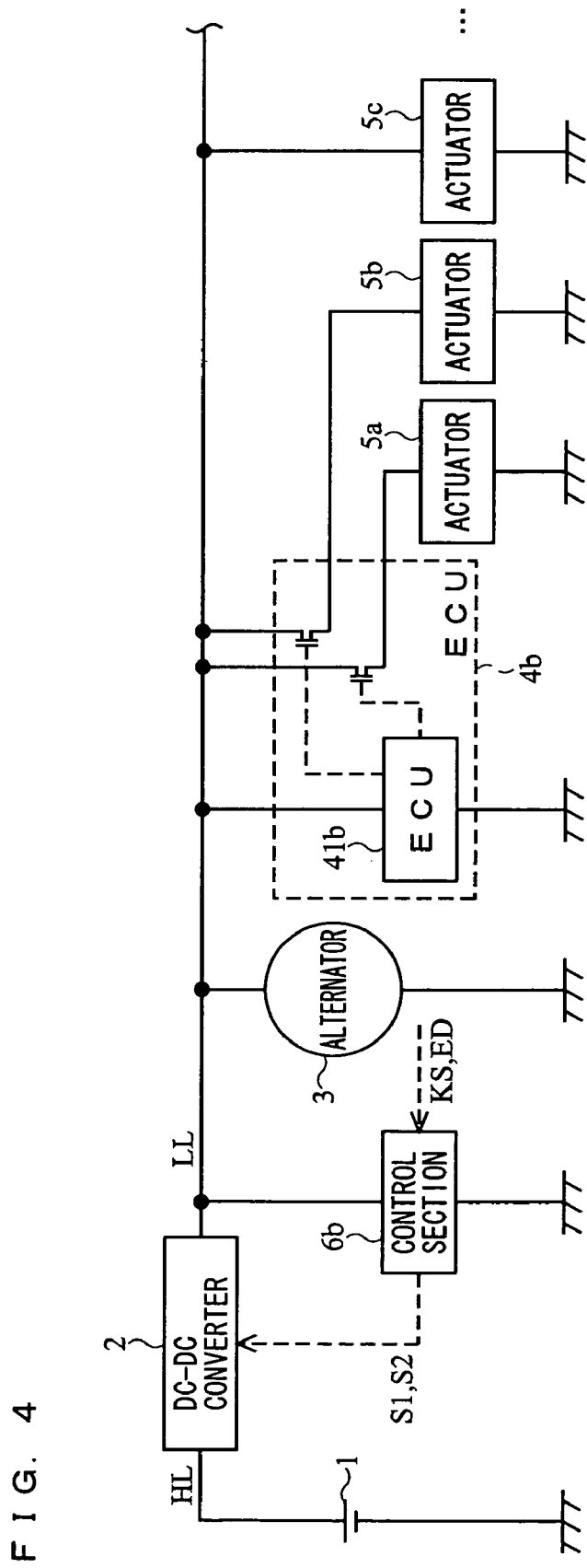
FIG. 4 is a schematic block diagram showing an exemplary configuration of a part of a power supply system in which driving system devices and control system devices are connected to the same power supply path.
Figure 5:
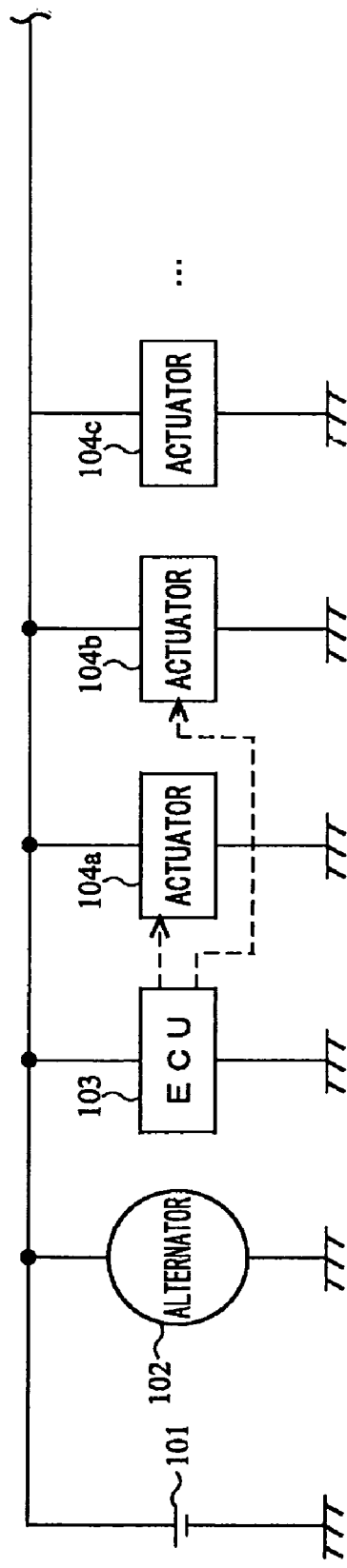
FIG. 5 is a schematic block diagram showing an exemplary configuration of a part of a conventional power supply system.

However, in a case where there is no need to suppress influences of voltage fluctuation of the electric power to be supplied to the control system devices and of a voltage drop associated with the operations of the driving system devices, the driving system devices and the control system devices may be connected to the same power supply path. Hereinafter, with reference to FIG. 4, a power supply system in which the driving system devices and the control system devices are connected to the same power supply path is described. FIG. 4 is a schematic block diagram showing an exemplary configuration of a part of the power supply system in which the driving system devices and the control system devices are connected to the same power supply path.

As shown in FIG. 4, in this power supply system, electric loads including control system devices (the CPU 41b and the control section 6b) provided in the vehicle are connected to the low potential line LL, respectively, to be supplied with electric power. Specifically, in the power supply system, the battery 1 that supplies electric power of a predetermined voltage is mounted in the same manner as in the power supply system described with reference to FIG. 1. The battery 1 is connected to the alternator 3 via the DC-DC converter 2, and is charged with electric power generated by the alternator 3. To the positive terminal of the alternator 3, the low potential line LL is connected, and to the low potential line LL, an ECU 4b, the actuators 5a to 5c, and a control section 6b are connected. Note that, the power supply system is different from the power supply system described with reference to FIG. 1 in that the control system devices are supplied with electric power from the low potential line LL, but, with regard to other components, is the same as the power supply system described with reference to FIG. 1. In the following description, like components are denoted by like reference numerals, and detailed description is omitted.

The ECU 4b includes a CPU 41b therein. the CPU 41b is supplied with electric power necessary to operate from the low potential line LL, in the same manner as the actuators 5a to 5c. That is, the CPU 41b as well is connected to the positive terminal of the alternator 3 via the low potential line LL. The CPU 41b controls electric power supply to the actuators 5a and 5b. Specifically, the electric power supply to the actuators 5a and 5b is controlled by performing ON/OFF control of the path from the low potential line LL to the actuators 5a and 5b.

The control section 6b is composed of a common microcomputer and the like in the same manner as the control section 6a. The control section 6b generates driving signals S1 and S2 based on a key position signal KS and engine state data ED that are inputted, so as to control the operation of the DC-DC converter 2. Electric power necessary for the control section 6b to operate is supplied from the low potential line LL. That is, the control section 6b as well is connected to the positive terminal of the alternator 3 via the low potential line LL, in the same manner as the other electric loads. Since operations of the control section 6b to control the DC-DC converter 2 are the same as the operations of the control section 6a described above, detailed description is omitted.

As described above, even in the case of the power supply system in which driving system devices and control system devices are connected to the same power supply path, when the vehicle is in an engine operating state, the battery 1 is charged at the charging voltage obtained by boosting the power generation voltage of the alternator 3 by the DC-DC converter 2, and concurrently, electric loads including control system devices are supplied with electric power of the power generation voltage of the alternator 3. That is, it is possible to set the power generation voltage of the alternator 3 lower than the charging voltage for the battery 1, thereby enabling adjustment of the power generation voltage to the rated voltage of each electric load. Therefore, in the power supply system, it is possible to apply an optimum voltage to the electric loads, while securing the charging performance for the battery 1, thereby enabling suppression of the power consumption at the electric loads and improvement of the fuel consumption of the vehicle.

Note that, in the power supply system described with reference to FIG. 1, the electric loads of the driving system devices may be connected to the high potential line HL so as to be supplied with electric power. For example, when the current resistance characteristic of the DC-DC converter 2 is taken into consideration, an actuator having a high rated current which is driven before or after the engine is started (for example, a starter which is activated when the engine is started) may be preferably connected to an electric power supply line which does not pass through the DC-DC converter 2. In addition, in general, such an actuator is driven independently of the control system devices (the CPU 41a, the control section 6a) that are supplied with electric power from the same high potential line HL, and the driving period of the actuator is immediately before and immediately after the engine is started. That is, the drive of the actuator does not influence various controls that are to be started by the control system devices after the engine is started. Therefore, even in a case where electric loads, such as a starter, are connected to the high potential line HL, it is still possible to attain the effect obtained by separating the power supply path for control system devices and the power supply path for the driving system devices.

In the description above, the control section 6 performs operations to control the DC-DC converter 2. However, other control sections mounted in the vehicle may control the DC-DC converter 2. In the description above, an example is described in which a plurality of control sections, typified by the. ECU 4 (CPU 41) and the control section 6, perform the respective operations. However, the plurality of control sections may perform operations according to other embodiments. For example, the ECU 4 (CPU 41) may perform the operations that are to be performed by the control section 6 described above. In addition, the control section 6 may be provided inside or outside the DC-DC converter 2.

The voltages and the like described above are only examples and it is understood that the present invention may be realized by using other voltages. In the description above, it is assumed that the electric power is supplied at a rated voltage of 12V, and the output voltage of the battery 1 is set to approximately 12V, the charging voltage for the battery 1 is set to approximately 14V, and the power generation voltage of the alternator 3 is set to approximately 12V. For example, when it is assumed that the electric power is supplied at a rated voltage of 24V, which is employed in a large-sized vehicle and the like, the output voltage of the battery 1 may be set to approximately 24V, the charging voltage for the battery 1 may be set to approximately 28V, and the power generation voltage of the alternator 3 may be set to approximately 24V. As described above, it is understood that only if the rated voltage of the electric loads and the power generation voltage of the generator are matched and the power generation voltage is boosted to the charging voltage for the power storage device by the DC-DC converter, any combination of voltages may be applicable.

In the description above, an example in which the power supply system is installed in a vehicle is described. However, the power supply system may be provided in any other movable body in which a generator and a power storage device are mounted. For example, the power supply system according to the present invention may be installed in various movable bodies, such as airplanes and marine vessels, in addition to vehicles such as passenger cars, large-sized vehicles, and two-wheeled vehicles.

While the invention has been described in detail, the foregoing description is in all aspects illustrative and not restrictive. It is understood that numerous other modifications and variations can be devised without departing from the scope of the invention.

INDUSTRIAL APPLICABILITY

The power supply system according to the present invention is capable of suppressing the power consumption at electric loads while securing the charging performance for a battery and is applicable to a power supply system and the like in which a power storage device and a generator are mounted.

The invention claimed is:

1. A power supply system that supplies electric power to electric loads including actuators, the electric loads being mounted in a movable body, the power supply system comprising:
   a generator that generates electric power of a first voltage;
   a transformer circuit that boosts the electric power of the first voltage to a second voltage; and
   a battery that is connected, via the transformer circuit, to the generator and that stores electric power of the second voltage obtained by the boosting by the transformer circuit, wherein
   at least one of the actuators is connected on the generator side of the transformer circuit, so as to be supplied with the electric power of the first voltage,
   the electric loads include a control device that controls a moving function of the movable body,
   the control device is connected on the battery side of the transformer circuit,
   the actuators include a controlled actuator whose drive is controlled by the control device,
   the controlled actuator is connected on the generator side of the transformer circuit, and
   the battery side and the generator side are connected to each other only via the transformer circuit that boosts the electric power of the first voltage to the second voltage.

2. The power supply system according to claim 1, wherein
   the transformer circuit is configured to be capable of supplying electric power bidirectionally from the generator side to the battery side and from the battery side to the generator side, and
   the power supply system further includes a transformer circuit control section that controls a power supply direction and a power supply voltage of the transformer circuit in accordance with a state of the movable body.

3. The power supply system according to claim 2, wherein
   when supplying electric power from the generator side to the battery side, the transformer circuit control section controls the transformer circuit to boost the electric power of the first voltage to the second voltage, so as to supply the resultant electric power to the battery side, and
   when supplying electric power from the battery side to the generator side, the transformer circuit control section controls the transformer circuit to step down electric power of an output voltage of the battery to the first voltage, so as to supply a resultant electric power to the generator side.

4. The power supply system according to claim 2, wherein
   when supplying electric power from the generator side to the battery side, the transformer circuit control section controls the transformer circuit to boost the electric power of the first voltage to the second voltage, so as to supply the resultant electric power to the battery side, and
   when supplying electric power from the battery side to the generator side, the transformer circuit control section controls the transformer circuit to supply electric power of an output voltage of the battery to the generator side, the electric power being unchanged.

5. The power supply system according to claim 3, wherein,
   when the movable body is in an engine operating state, the transformer circuit control section controls the transformer circuit to supply electric power from the generator side to the battery side, and
   when the movable body is in an engine stop state, the transformer circuit control section controls the transformer circuit to supply electric power from the battery side to the generator side.

6. The power supply system according to claim 1, wherein the battery is a lead storage battery.

7. The power supply system according to claim 4, wherein,
   when the movable body is in an engine operating state, the transformer circuit control section controls the transformer circuit to supply electric power from the generator side to the battery side, and
   when the movable body is in an engine stop state, the transformer circuit control section controls the transformer circuit to supply electric power from the battery side to the generator side.

* * * * *